United States Patent [19]

Spaeth

[11] Patent Number: 4,550,508

[45] Date of Patent: Nov. 5, 1985

[54] DOUBLE-FLANK COMPOSITE ERROR TESTER

[75] Inventor: Hans Spaeth, Kloten, Switzerland

[73] Assignee: Maag Gear-Wheel and Machine Company Limited, Zurich, Switzerland

[21] Appl. No.: 705,150

[22] Filed: Feb. 25, 1985

[30] Foreign Application Priority Data

Mar. 1, 1984 [CH] Switzerland .......................... 996/84

[51] Int. Cl.⁴ ............................................. G01B 5/20
[52] U.S. Cl. ........................ 33/179.5 C; 33/179.5 D; 33/179.5 B
[58] Field of Search .................. 33/179.5 R, 179.5 B, 33/179.5 D, 179.5 C, 179.5 E

[56] References Cited

U.S. PATENT DOCUMENTS

| | | | |
|---|---|---|---|
| 1,554,646 | 9/1925 | Olson | 33/179.5 D |
| 3,031,765 | 5/1962 | Müller | 33/179.5 C |
| 3,336,789 | 8/1967 | Mayer | 33/179.5 B |
| 3,851,398 | 12/1974 | Hilburger | 33/179.5 B |
| 4,488,359 | 12/1984 | Misson | 33/179.5 D |

FOREIGN PATENT DOCUMENTS

1959837 9/1970 Fed. Rep. of Germany ..... 33/179.5 R
3141350 5/1983 Fed. Rep. of Germany ..... 33/179.5 R

*Primary Examiner*—Willis Little
*Attorney, Agent, or Firm*—Werner W. Kleeman

[57] ABSTRACT

The double-flank composite error tester contains at least one magnet by means of which an associated gear is brought into a predetermined, always identical rotary position and fixedly held in this position prior to being interengaged with the teeth of another gear. A sensor is positioned adjacent the circumference of the other gear opposite to the center of a tooth tip or of a tooth space of the other gear. The teeth data of the other gear are supplied to a pulse processor. The other gear is then rotated and pulses are generated by the sensor due to this rotation. The pulses are fed to the pulse processor which generates pulses for controlling rotary drive means on the basis of the pulses received from the sensor and the teeth data supplied to the pulse processor. Such controlling pulses correspond to a central position at which the one gear can be engaged with the other gear in a collision-free manner. Instead of the sensor a magnet can be used and then the pulse processor can be omitted. This automatically operating error tester can be installed at a transfer line. In such installation the measuring device merely must determine for each set of gear teeth whether a permissible tolerance is maintained with respect to the gear center distance. Using such error tester there can be simultaneously tested two sets of teeth at two gears, and for this purpose such gears are each engaged with a related gauging gear.

18 Claims, 6 Drawing Figures

DOUBLE-FLANK COMPOSITE ERROR TESTER

BACKGROUND OF THE INVENTION

The present invention relates to a new and improved construction of a double-flank composite error tester for determining gear errors.

In its more particular aspects the present invention specifically relates to a new and improved double-flank composite error tester for determining gear errors and which comprises at least two gear holding supports. At least one of the at least two gear holding supports is mounted at a spring-loaded displaceable slide which can be displaced relative to another gear holding support of said at least two gear holding supports. In such double-flank composite error tester, prior to engaging the teeth of at least one pair of gears, the tooth tip of one gear of the pair of gears can be aligned with a tooth space of the other gear of the pair of gears.

A double-flank composite error tester for determining gear errors as known, for example, from the MAAG Company brochure "DAS-2", A53a-D 8.78, serves for rapidly determining the total effect of all gear errors present in external or internal spur or helical gears as well as in bevel gears and worm gears by rolling two of such gears in mesh with zero backlash. This known double-flank composite error tester comprises a bed made of gray cast iron. On guideways of the bed there are mounted a fixedly clampable or adjustable slide and a displaceable or floating, spring-loaded slide. These two slides carry the two gear holding supports for the gears to be tested. There is further mounted a dial indicator at the displaceable slide.

The two gears to be tested are manually placed in such a relative position that the tooth tip of one of the gears and the tooth space or gap of the other one of the gears face each other and are arranged on a line which interconnects the central axes of the two gear holding supports. The two gears are meshed or interengaged with zero backlash by displacing the fixedly clampable or adjustable slide in such a manner that the working gear center distance of the two gears is precisely adjusted and the fixedly clampable or adjustable slide is then fixedly clamped. The displaceable or floating slide which carries the dial indicator is supported at balls and is held in its end position by means of the spring load.

Whenever the interengaged pair of gears is rotated either manually or by suitable drive means, the displaceable or floating slide transmits its movements to the dial indicator or a recording device by means of which the total effects of all gear errors can be recorded. The diagrams which are obtained in the last case can then be evaluated with respect to different aspects: Radial runout errors are variations in the gear center distance during rotation of the gears; pitch errors are recognizable in the diagram by acute, irregularly occurring fluctuations or excursions which vary from tooth to tooth; profile form errors are deviations from the true involute referred to the relevant base circle and result in a diagram of wave-like appearance; pressure angle errors occur when the flank profile is incorrectly positioned relative to the base circle and are recognizable in the diagram by regularly occurring fluctuations or excursions.

In the known double-flank composite error tester, as explained hereinbefore, the gear teeth of the two gears must be manually aligned relative to each other prior to interengagement such that a tooth faces a tooth space and a collision is prevented between the tooth tip of one gear and the tooth tip of the other gear. Such manual alignment operation is too expensive with respect to time for a measuring operation integrated in a production line. Therefore, the known double-flank composite error tester can not be used in such cases.

SUMMARY OF THE INVENTION

Therefore, with the foregoing in mind, it is a primary object of the present invention to provide a new and improved construction of a double-flank composite error tester for determing gear errors and in which the teeth of a pair of gears, prior to their zero-backlash interengagement, are automatically aligned in such a manner that a tooth in one gear of the pair of gears faces a tooth space in the other gear of the pair of gears and a collision is thereby prevented between the tooth tip of the one gear and the tooth tip of the other gear.

Now in order to implement this and still further objects of the invention, which will become more readily apparent as the description proceeds, the error tester of the present development is manifested by the features that, for the alignment operation the one gear is fixedly associated with gear teeth means and a magnet is provided which acts upon such gear teeth means in order to position the one gear in a predetermined rotary position, and a positioning device is associated with the other gear, whereby the other gear can be brought into a predetermined position relative to the predetermined rotary position of the one gear.

According to the invention the one gear is always positioned in the same manner, namely by fixedly holding one tooth of this gear in a sufficiently narrowly defined position by means of the magnetic field of force generated by the magnet. The magnet thus ensures that the gear teeth means of the one gear always assumes the same rotary position and is retained in this position prior to being moved into the gear teeth of the other gear. Since this rotary position is identical at all times and known in advance, the other gear can be placed into the predetermined relative position with respect to the rotary position of the one gear by means of the positioning device which is associated with the other gear in accordance with the invention. Collision-free interengagement of the gears is thereby permitted.

The inventive double-flank composite error tester, therefore, can be employed in an automatic measuring operation integrated with a production line since the gears are automatically aligned relative to each other at the double-flank composite error tester prior to their interengagement. The manual operational step of alignment is thus eliminated and there also additionally results a considerable saving of time.

Preferably, the magnet may constitute a permanent magnet or an electromagnet depending upon the momentary requirements with respect to mass, moments of inertia, frictional moments, torque conditions and so forth.

Advantageously, the magnet and/or the positioning device can be adjusted with respect to the circumferential direction and/or the radial direction of the associated gear. In this manner the inventive double-flank composite error tester can be adapted to various tooth numbers or gear diameters in a simple manner.

The most simple construction of the positioning device is achieved when the positioning device is constituted by a magnet acting upon the gear teeth which are fixedly associated with the other gear and which positions the other gear in the aforementioned relative position. Therefore, the two gears are placed into a predetermined relative position with respect to each other by means of the magnets. These relative positions can be readily established as a function of the data of the gears to be tested by a corresponding preceding adjustment of the magnets.

According to a further advantageous development of the inventive double-flank composite error tester the positioning device may comprise a sensor which responds to a tooth tip or a tooth space and generates pulses corresponding to the tooth tips or tooth spaces when the other gear is moved relative to the sensor. Such positioning device further comprises rotary drive means operatively associated with the other gear and such rotary drive means are controlled by pulses from a pulse processing circuit arrangement which correlates the pulses generated by the sensor with the gearing data of the other gear.

Such construction may be somewhat more expensive, however may be required in certain cases, for example, when the rotary drive means in an existing double-flank composite error tester can not be readily disengaged for the alignment operation or when the gear to be aligned is made of a non-magnetizable material and so forth.

In the most simple case the gear teeth means which are fixedly associated with the one gear constitute the gear teeth of the one gear and the magnet directly acts upon the gear teeth of the one gear.

Advantageously, the gear teeth means which is acted upon by the magnet, is provided at a positioning gear arranged coaxially and form-lockingly connectable to the associated gear. There is thus offered the possibility of optimizing the gear teeth which are acted upon by the magnet, with respect to shape and/or material. Furthermore, the positioning gear can be more easily protected from contamination because the positioning gear usually is arranged below the gear associated therewith.

In an advantageous further design there are simply provided webs instead of teeth at the positioning gear which allows an even simpler optimization and substantially reduces the manufacturing costs of the positioning gear.

A further advantageous embodiment of the inventive double-flank composite error tester is particularly suited for determining gear errors of two rigidly interconnected gears. In such error tester the gear teeth of the two gears are intended to be simultaneously examined. The counter gears which are engaged with the gears to be tested during actual operation are not available for the measurement. In this case it can be determined in a simple manner whether the deviations from the gear center distance are within a predetermined tolerance range in order to classify the tested gears as "good" or "reject".

Since the two rotary positions in which the gauging gears must be positioned, have a predetermined relative position with respect to each other and which is predetermined by the data of the gears to be tested, a second magnet which is essentially identical to the magnet of the positioning device for the other gear, advantageously is adjustable in the circumferential direction of the gear. In this arrangement the two gauging gears can be simultaneously brought into engagement with the gears to be tested. There thus results the most simple construction of the inventive double-flank composite error tester which is achieved when, as stated hereinbefore, the positioning device constitutes a magnet which is adjustable in the circumferential direction of the gears to be tested and when either the gear holding support for the gears to be tested is of a sufficiently smooth-running nature or the rotary drive means of the gear holding supports can be disengaged for the alignment operation.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that only enough of the construction of the double-flank composite error tester has been shown as needed for those skilled in the art to readily understand the underlying principles and concepts of the present development, while simplifying the showing of the drawings. Turning attention now specifically to FIG. 1, there has been schematically illustrated the basic construction of a first exemplary embodiment of the inventive double-flank composite error tester which is designated in its entirety by the reference numeral 1.

Figure 1:
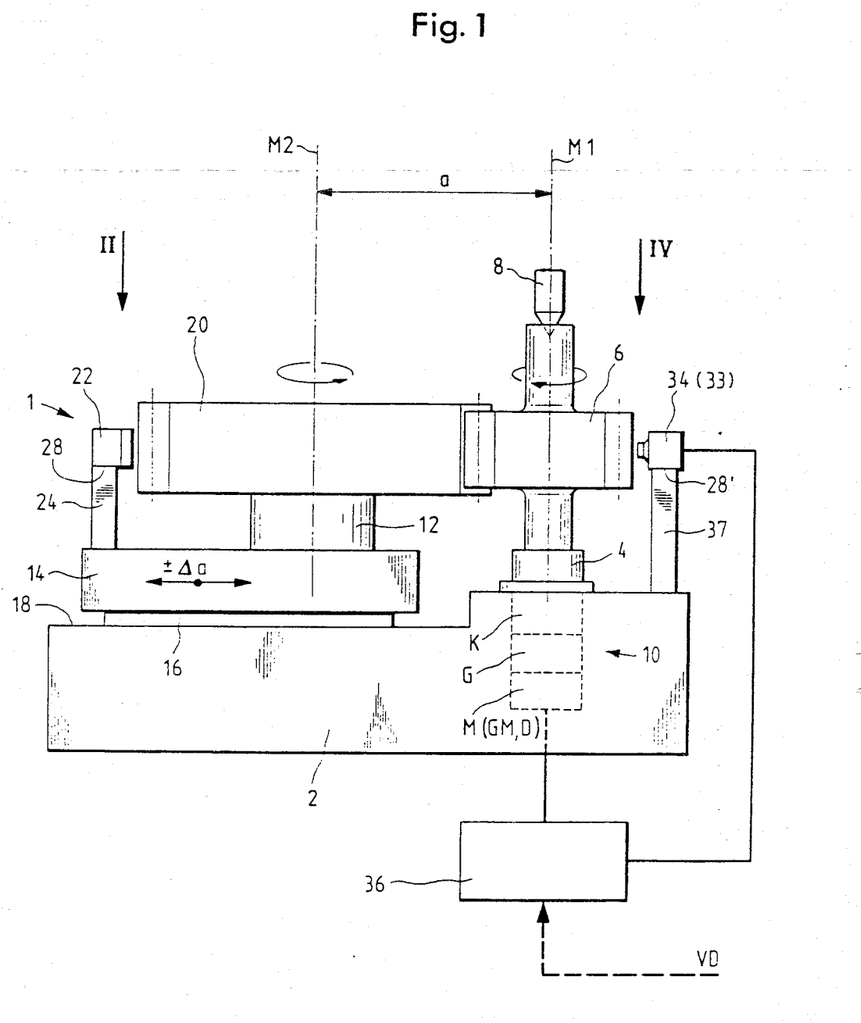
FIG. 1 is a schematic side view of a first embodiment of the inventive double-flank composite error tester.

A first gear holding support 12 is mounted at a spring-loaded displaceable or floating slide 14 which is displaceably mounted at a further slide 16 which, in turn, is displaceably mounted at flat or planar guideways 18 which are supported by a bed 2 of the double-flank composite error tester. The first gear holding support 12 accommodates one gear 20 of a pair of gears 6, 20 to be tested and this one gear 20 either may constitute a gauging gear or the gear with which the other gear 6 of the pair of gears 6, 20 meshes in actual operation.

A second gear holding support 4 is mounted at the bed 2 and accommodates the other gear 6 of the pair of gears 6, 20 to be tested. The other gear 6 is accommodated by the second gear holding support 4 on one side and, on the other side, by means of a conventional tip or point 8 which constitutes a part of the second gear holding support 4. Below the second gear holding support 4 there are arranged rotary drive means designated in their entirety by the reference numeral 10. Such rotary drive means 10 comprise a motor M, a transmission G and a clutch K, all of which are of conventional structure and therefore only schematically illustrated.

The displaceable slide 14 with the first gear holding support 12 mounted thereat and containing the one gear 20 can be displaced away from and towards the second gear holding support 4 by means of the further slide 16. Using the further slide 16 which constitutes interengaging means for meshing the one gear 20 and the other gear 6 of the pair of gears 6, 20 to be tested after the gears 6 and 20 have been aligned, there is adjusted the working gear center distance a between the two gears 6 and 20. The deviations ±Δa from the gear center distance are measured by means of the displaceable slide 14 as they occur during rotation of the gears 6 and 20 which are in mesh with zero backlash as initially explained with reference to the known double-flank composite error tester. The one gear 20 is freely rotatably journaled at the first gear holding support 12 and the other gear 6 can be set to rotate by the rotary drive means 10.

Figure 2:
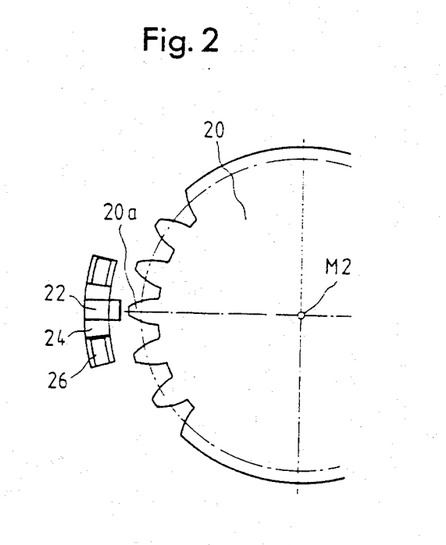
FIG. 2 is a partial view looking in the direction of the arrow II in FIG. 1 and shows the arrangement of a magnet which acts upon the gear teeth means in the apparatus illustrated in FIG. 1.
Figure 3:
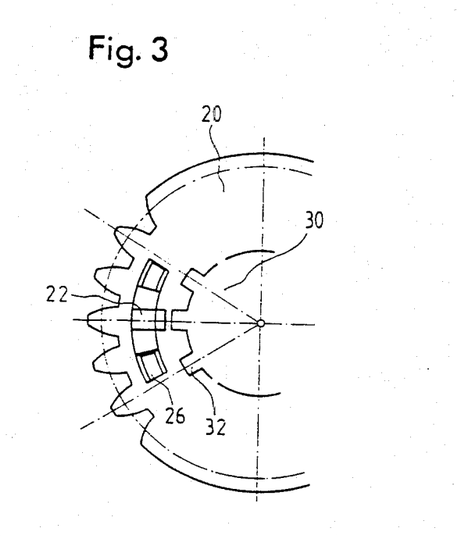
FIG. 3 shows, in a view similar to FIG. 2, a modified arrangement in which the magnet acts upon gear teeth means provided at a positioning gear in the inventive double-flank composite error tester illustrated in FIG. 1.

A magnet 22 of aligning means 22, 10, 34, 36 is mounted at a holder 24 adjacent the circumference of the one gear 20. The holder 24 is displaceably arranged in a circumferential groove 26 at the top side of the displaceable slide 14, as indicated in FIGS. 2 and 3. The holder 24 can be locked into any position within the circumferential groove 26, for example, by means of a not particularly illustrated locking screw. The magnet 22 is also displaceably mounted at the holder 24 within a range 28, so that its position is radially adjustable with respect to the circumference of the one gear 20 as required. The magnetic force field of the magnet 22 acts upon gear teeth means fixedly associated with the one gear 20 and constituting the teeth of the one gear 20. As shown in FIG. 2, the magnet 22 acts upon a tooth 20a of the teeth of the one gear 20 and fixedly holds this tooth 20a at a narrowly defined position. Depending upon the momentary requirements with respect to mass, moments of inertia, frictional moments, torque conditions and so forth the magnet 22 may constitute a permanent magnet or an electromagnet which can be switched on and off. When the one gear 20 has been placed at the first gear holding support 12, the gear 20 can be freely rotated either as such or conjointly with the first gear holding support 12. The one gear 20 thus is instantaneously placed into a predetermined rotary position shown in FIG. 2 by means of the magnet 22.

In accordance with the illustration in FIGS. 3 and 6 the one gear 20 can also be positioned in an always identical rotary position by gear teeth means constituting a positioning gear 30 arranged below the one gear 20. The positioning gear 30 carries at its outer circumference gear teeth means formed by teeth or webs 32 which are arranged at a predetermined pitch and which are either integrally formed with the positioning gear 30 or which are inserted thereinto. The pitch or number of teeth or webs 32 may be equal to the predetermined pitch or number of gear teeth at the one gear 20 or may be equal to an integral fraction like, for example, $\frac{1}{2}$, $\frac{1}{4}$, 1/6 and so forth of the number of teeth at the one gear 20. There is thus offered the possibility of optimizing the teeth or webs 32 of the positioning gear 30 for the magnetic detection with respect to shape or material, of avoiding magnetization of the one gear 20, and of more readily protecting from contamination the gear teeth means which are acted upon by the magnet 22.

A positioning device 10, 34, 36 forms a part of the aforementioned aligning means and is provided for the other gear 6 in the presently described exemplary embodiment of the inventive double-flank composite error tester. Such positioning device comprises a sensor 34 which is arranged at the bed 2 adjacent the outer circumference of the other gear 6 and which responds to either the tooth tips or the tooth spaces of the gear teeth of the other gear 6. This sensor 34 may constitute a contactless-operating inductive transmitter, an optical or a mechanical sensor sensing the tooth tip or the tooth space of the other gear 6. Whenever there is relative movement between the sensor 34 and the other gear 6, the sensor 34 generates pulses the start and the end of each of such pulses corresponding to the leading flank and to the trailing flank, respectively, of a tooth tip or of a tooth space of the other gear 6. The pulses generated by the sensor 34 are transmitted to a pulse processing circuit arrangement or pulse processer 36 which is only schematically illustrated and which, in turn, generates pulses for controlling the rotary drive means 10. The sensor 34, the pulse processing arrangement 36 and the rotary drive means 10 form the positioning device for placing the other gear 6 into a predetermined relative position with respect to the predetermined rotary position of the one gear 20 which has been placed into such rotary position by means of the magnet 22, in such a manner that the gear teeth of the two gears 6 and 20 can be meshed in a collision-free manner by displacing the further slide 16 towards the other gear 6 to such extent that the working gear center distance a is adjusted.

Figure 4:
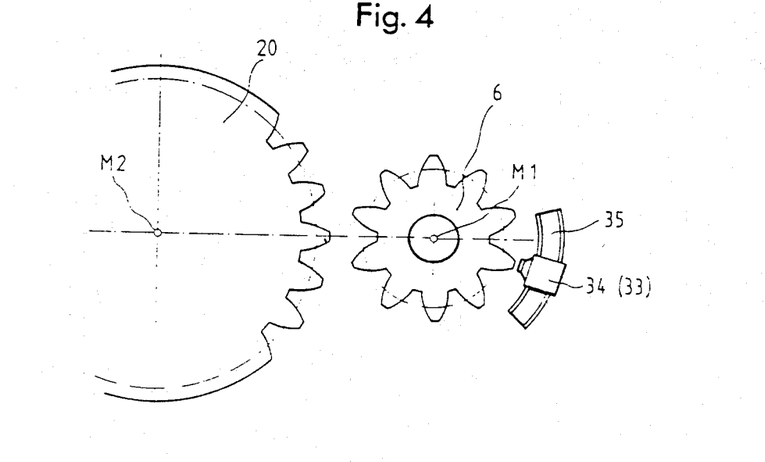
FIG. 4 is a partial view looking in the direction of the arrow IV in FIG. 1.

The sensor 34 is arranged at a holder 37 and is radially adjustable within a range 28' at such holder 37. The holder 37 is adjustable within a curved groove 35, see FIG. 4, and the center of curvature of such groove 35 is placed on a central axis M1 of the second gear holding support 4. The holder 37 is thus adjustable in the circumferential direction of the other gear 6. During the alignment operation which will still be described in further detail hereinbelow, the sensor 34 is adjusted such that the sensor 34 points to the center of a tooth tip or of a tooth space of the other gear 6. In a preceding operation the gear teeth data of the other gear 6 have been supplied to the pulse processing circuit arrangement 36 via an input line VD. The pulse processing circuit arrangement 36 is thus enabled to generate the required pulses for rotating the other gear 6 into a center position by means of the rotary drive means 10 and correlates the pulses generated by the sensor 34 and the teeth data. In such center position a tooth space of the other gear 6 is located precisely opposite a tooth of the one gear 20 as illustrated in FIG. 4. When this center position has been reached by means of the last-mentioned pulses, the motor M is stopped at this position. Consequently, the teeth of the gears 6 and 20 can now be meshed in a collision-free manner as described hereinbefore.

In a modification of the exemplary embodiment of the inventive double-flank composite error tester shown in FIG. 1, the positioning device is constituted by a magnet 33 which can be used like the magnet 22 and instead of the sensor 34. In such case the pulse processing circuit arrangement 36 can be omitted. It is merely required to bring the magnet 33 which has replaced the sensor 34, into the position shown in FIG. 4 so that this magnet 33 can bring the tooth facing the magnet 33 into the illustrated position. Collision-free meshing of the gear teeth thus is again enabled. For this purpose the motor M of the rotary drive means 10 is decoupled from the second gear holding support 4 by means of the clutch K in order to mount the other gear 6 as much as possible in a freely rotatable manner. After conclusion of the positioning operation by means of the magnet 33 which has replaced the sensor 34, the clutch K can be re-engaged.

When the sensor 34 is employed, the motor M of the rotary drive means 10 may either constitute a stepping motor or a d.c. motor GM with associated rotary transmitter D which is not illustrated in detail. When the magnet 33 is used instead of the sensor 34, any suitable motor can be used as the drive motor M since the desired rotary position of the other gear 6 for collision-free meshing of the gear teeth, then, is adjusted only by the magnet 33.

The aligning operation is as follows in the first embodiment of the double-flank composite error tester illustrated in FIGS. 1 to 4:

The magnet 22 of the aligning means and arranged adjacent the circumference of the one gear 20 is adjusted in such a manner that the magnet 22 positions the one gear 20 after mounting at the first gear holding support 12 always in the same predetermined rotary position. This is achieved due to the magnetic field of the magnet 22 which fixedly holds one tooth 20a of the one gear 20 in a sufficiently narrowly defined position as shown in FIG. 2. During this operation the displaceable slide 14 is displaced towards the left to a sufficient extent by means of the further slide 16 shown in FIG. 1. The distance between the two central axes M1 and M2 of the gear holding supports 4 and 12 is then substantially greater than the working gear center distance a. The other gear 6 is then accommodated between the second gear holding support 4 and the vertically adjustable tip or point 8 in the position shown in FIG. 1.

The sensor 34 of the aligning means is pivoted about the central axis M1 by displacing its holder 37 within the groove 35 in such a manner that the sensor 34 is placed in a position opposite to the center of a tooth tip or of a tooth space of the other gear 6. The teeth data of the other gear 6 are supplied to the pulse processing circuit arrangement or pulse processer 36 of the aligning means via the input line VD. When the other gear 6 is now rotated by the rotary drive means 10 of the aligning means, the pulse processing circuit arrangement 36 detects the tooth tip angle or tooth space angle by means of the corresponding number of pulses generated by the sensor 34 and determines the relative position of the other gear 6 as is shown in FIG. 4. In this position a tooth space of the other gear 6 is centrally located opposite to a tooth tip of the one gear 20. The motor M is stopped and held in the stopped condition at this position of the other gear 6. Before this operation the sensor 34 and the other gear 6 are positioned relative to each other by the eye of the operator. When such relative positioning is still too imprecise with respect to the conformity of the tooth space and the tooth tip of the gears 6 and 20, on the one hand, and with respect to the determination of the tooth tip center and the tooth space center by means of the pulse processing circuit arrangement 36, on the other hand, the position of the sensor 34 can be readjusted by the required amount.

When a gear to be tested comprises plural sets of gear teeth which are to be tested simultaneously, the aligning operations described hereinbefore are performed for each one of the different sets of gear teeth using separate and related sensors.

When the predetermined relative position of the other gear 6 shown in FIG. 4 has been obtained, the displaceable slide 14 is displaced into the measuring position by means of the further slide 16, i.e. the working gear center distance a is adjusted between the gears 6 and 20. After meshing the gears 6 and 20 with zero backlash, the actual measuring operation can be started. During such measuring operation the variations in the gear center distance $\pm\Delta a$ which appear within a complete revolution of the two gears 6 and 20, are detected and this has been initially described with reference to the prior art double-flank composite error tester.

Figure 5:
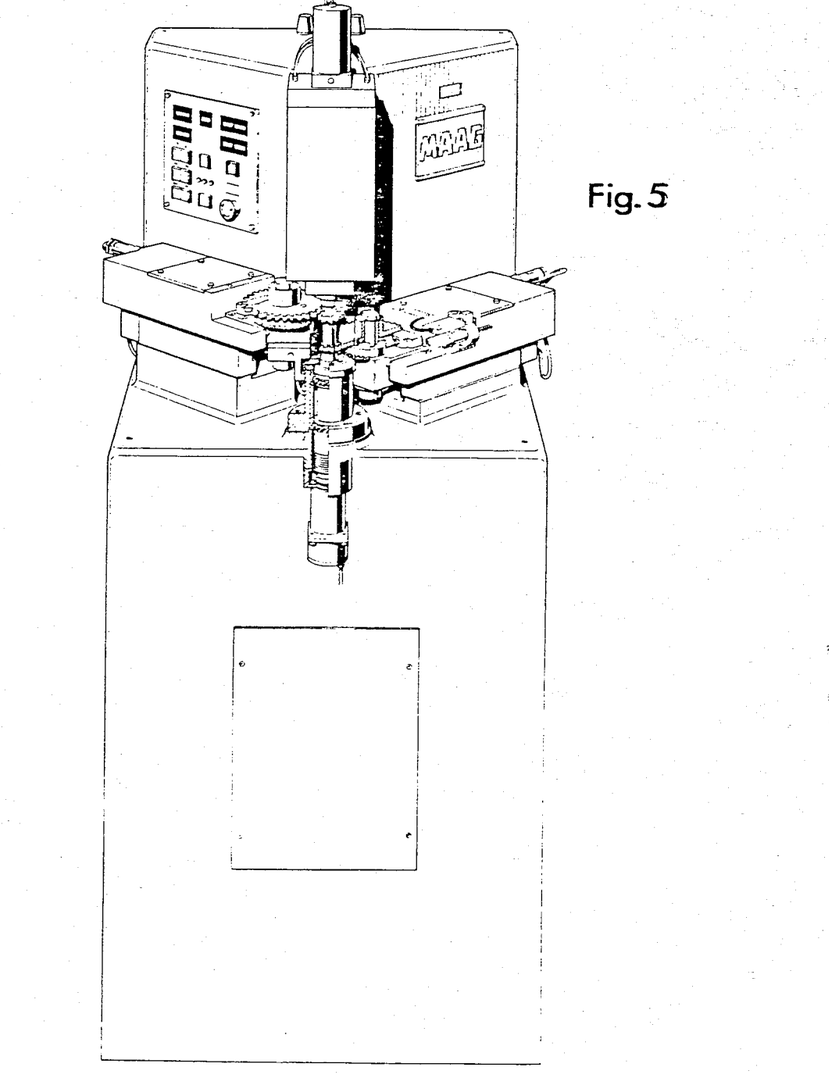
FIG. 5 is a partially sectional view of a second embodiment of the inventive double-flank composite error tester.

A second embodiment of the inventive double-flank composite error tester is shown in FIG. 5 and such double-flank composite error tester constitutes an automatically operating apparatus which can be employed in a transfer line. This error tester merely must detect for each set of gear teeth whether the gear center distance exceeds or falls short of permissible tolerances with respect to the gear center distance a. In FIG. 6 components which are identical to components shown in FIGS. 1 to 4 have been generally designated by the same reference numerals. Comparable but additionally present components are designated by primed reference numerals. The illustrated double-flank composite error tester is designed for simultaneously testing two sets of gear teeth of one other gear 6 and a further gear 6 which are fixedly interconnected. An enormous measuring speed is thereby achieved.

In the aforementioned transfer line the other gear 6 and the further gear 6 are produced as one part or component and are intended to be subsequently and immediately tested. The counter gears with which they are engaged in actual operation, are not available in this case and, therefore, two gauging gears 20 and 20' are used for the error testing instead of the one gear 20 in the embodiment of FIGS. 1 to 4. The gauging gears 20 and 20' are manufactured with extreme precision and are meshed with the teeth of the interconnected other gears 6 and 6' which are manufactured at the transfer line and which are to be tested. The displacement or variation of the two working gear center distances a and a' between the gauging gears 20 and 20' and the related other gear 6 and further gear 6' are considered as a function of the degree to which the meshing tooth flanks are shaped with errors. Since it is known that each one of the gauging gears 20 and 20' has been extremely precisely manufactured and is extremely precisely guided, the error of the gear to be tested can be immediately determined.

Figure 6:
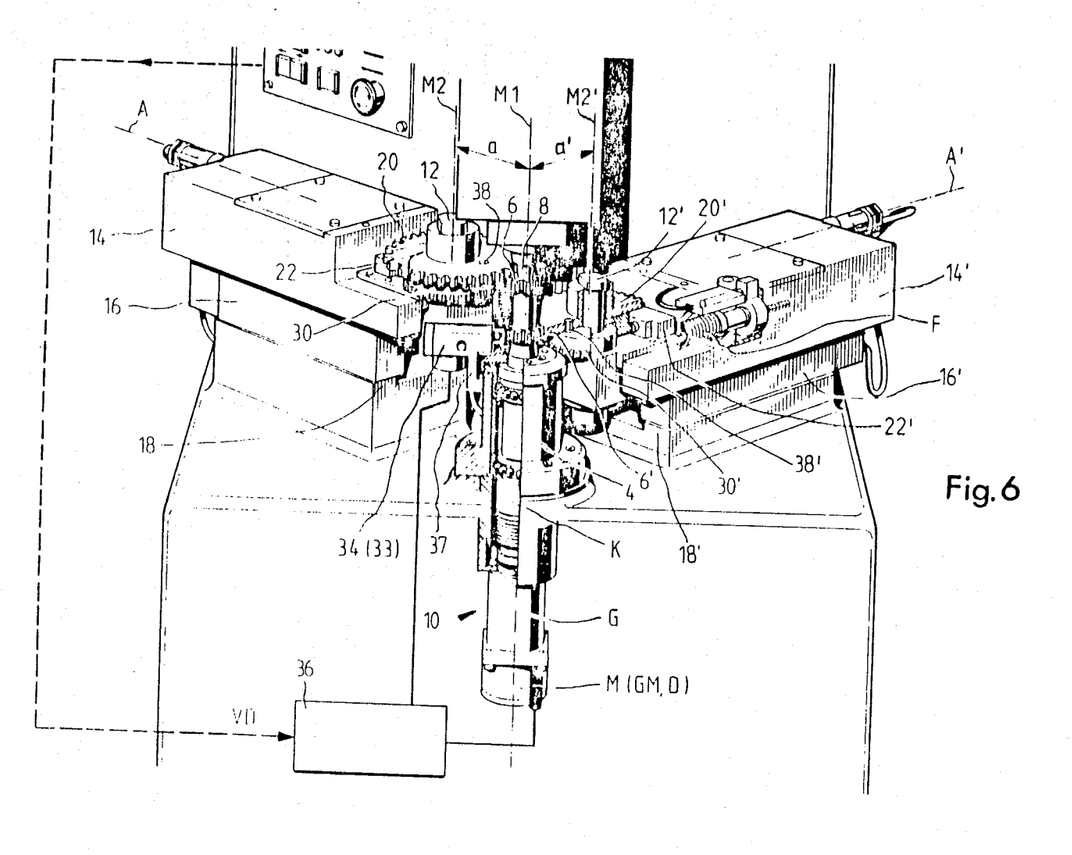
FIG. 6 is a partially sectional view of a detail in the double-flank composite error tester illustrated in FIG. 5.

As illustrated in FIG. 6, the second exemplary embodiment of the inventive double-flank composite error tester comprises a first displaceable slide 14 and a second displaceable slide 14' which are both spring-loaded and have essentially the same structure. A spring F can be recognized which is provided for the second displaceable slide 14'. The displaceable slides 14 and 14' can be respectively displaced along axes A and A' by means of associated further slides 16 and 16' on flat guideways 18 and 18'. The axes A and A' intersect the central axis M1 of the second gear holding support 4 and the vertically adjustable tip or point 8. The displaceable slides 14 and 14' are provided with a first gear holding support 12 and a third gear holding support 12'. Each one of the first and third gear holding supports 12 and 12' is provided with a related positioning gear 30 and 30'. Each one of the positioning gears 30 and 30' is provided with a respective alignment or set pin 38 and 38' which is received in a corresponding bore of the related gauging gear 20 and 20' In this manner the gauging gears 20 and 20' are coaxially coupled in a predetermined position with the related positioning gears 30 and 30'. A magnet 22 and a further magnet 22' are respectively mounted adjacent the circumference of the positioning gears 30 and 30' at the first and second displaceable slides 14 and 14' in such a manner as already described with reference to FIGS. 1 to 4 hereinabove. In the present case the magnets 22 and 22' are essentially identical and directly and without an intermediate holder inserted into a curved groove which corresponds to the curved groove 26 in FIG. 2 and which is not visible in FIG. 6. The further magnet 22' thus is adjustable in the circumferential direction defined by the second gauging gear 20'.

The second gear holding support 4 contains a ball-journaled spindle which can be coupled to the transmission G by means of a clutch K and the transmission G is operatively connected to the motor M. In the embodiment of the inventive double-flank composite error tester shown in FIG. 6 the sensor 34 is mounted for circumferential adjustment at the second gear holding support 4 by means of its holder 37. The output of the sensor 34 is connected to the pulse processing circuit arrangement 36 which, in turn, is operatively connected to the motor M. The input line VD for the teeth data of the other gear 6 and the further gear 6' is only schematically indicated in FIG. 6. Also in the case of the second exemplary embodiment of the inventive double-flank composite error tester shown in FIG. 6 the sensor 34 can be replaced by a magnet 33.

The aligning operation in the double-flank composite error tester shown in FIG. 6 is as follows:

The first and second displaceable slides 14 and 14' are displaced sufficiently far away from the central axis M1. The gauging gears 20 and 20' are mounted at the related first and third gear holding supports 12 and 12' and at the related alignment or set pins 38 and 38' while the first and second displaceable slides 14 and 14' are in the aforementioned position. In this embodiment the first and third gear holding supports 12 and 12' are not provided with drive means but are mounted in a freely rotatable manner. The magnets 22 and 22' automatically position the gauging gears 20 and 20' into a position as illustrated in FIG. 4. The magnets 22 and 22' precedingly have been correspondingly adjusted within their related guiding grooves which are not visible in FIG. 6. In the transfer line a robot arm places the interconnected other gear 6 and further gear 6' intermediate the second gear holding support 4 and the tip or point 8 and the other gear 6 and the further gear 6' are chucked therebetween. The other gear 6 and the further gear 6' are then placed in the manner as described hereinbefore with reference to FIGS. 1 to 4 into positions each of which corresponds to the illustration of FIG. 4. In these positions the gauging gear 20 is aligned for engagement with the other gear 6 and the second gauging gear 20' is aligned for engagement with the further gear 6'. Thereafter the first and second displaceable slides 14 and 14' are displaced in the direction towards the central axis M1 to such an extent that the working gear center distances a and a' are adjusted and the actual measuring operation can be started.

In the case that the magnet 33 is used instead of the sensor 34, the clutch K is disengaged prior to the alignment of the gears 6 and 6' so that such gears 6 and 6' can be adjusted in a freely rotatable manner by means of the magnet 33. In this case, as stated hereinabove, the pulse processing circuit arrangement 36 is not present. Simultaneous displacement of the first and second displaceable slides 14 and 14' is possible because in the present case the gears 6 and 6' are physically interconnected in a well-defined manner due to the production method, so that the magnets 22 and 22' can be brought into related relative positions in advance. In such positions of the magnets 22 and 22' each gauging gear 20 and 20' assumes a predetermined rotary position as illustrated in FIG. 4 relative to the related one of the gears 6 and 6' to be tested.

The double-flank composite error testers illustrated in FIGS. 1 to 6 can be used, like the initially described known double-flank composite error tester, for determining gear errors present in external or internal spur or helical gears as well as in bevel gears and worm gears by rolling the two gears in mesh with zero backlash. For testing worm gears it may, however, be required, due to the transmission ratio existent between the worm and the worm gear, that the rotary drive means 10 are not associated with the second gear holding support 4 but are provided at either one or both of the first and second displaceable slides 14 and 14'.

In the exemplary embodiment illustrated in FIG. 6 the following commercially available components have been used:

| Reference Numeral | Designation | Manufacturer | Type |
|---|---|---|---|
| 2, 22' | Magnet | Vacumschmeize (Hanau/Fed. Rep. of Germany) | Vacomax 200 |
| 33 | Magnet | Vacumschmelze (Hanau/Fed. Rep. of Germany) | Vacomax 200 |
| M | Stepping Motor | Berger | RDM 569/50 |
| GM | d.c. Motor | ITT Dunker | GR52.0 |
| D | Rotary Transmitter | MAAG | 929.4633.01 |
| 34 | Sensor | Baumer | IFR 04.26.25 |

While there are shown and described present preferred embodiments of the invention, it is to be distinctly understood that the invention is not limited thereto, but may be otherwise variously embodied and practiced within the scope of the following claims. Accordingly,

What I claim is:

1. A double-flank composite error tester for determining gear errors and comprising:
    at least one first gear holding support;
    at least one spring-loaded displaceable slide;
    said at least one first gear holding support being mounted at said at least one spring-loaded displaceable slide;
    a second oear holding support;
    said at least one spring-loaded displaceable slide being displaceable relative to said second gear holding support;
    said at least one first gear holding support and said second gear holding support supporting at least one pair of gears to be tested;
    each one of said gears of said at least one pair of gears to be tested defining respective gear teeth with a predetermined number of tooth tips and tooth spaces;
    aligning means for mutually aligning the gears of said at least one pair of gears to be tested such that the tooth tip of one gear of said at least one pair of gears to be tested is aligned with the tooth space of the other gear of said at least one pair of gears to be tested;

said aligning means including gear teeth means fixedly associated with said one gear of said at least one pair of gears to be tested and a magnet acting upon said gear teeth means in order to position said one gear in a predetermined rotary position;

said aligning means further including a positioning device associated with said other gear of said at least one pair of gears to be tested;

said positioning device positioning said other gear in a predetermined relative position with respect to said predetermined rotary position of said one gear of said at least one pair of gears to be tested; and means for interengaging the gear teeth of said one gear and said other gear of said at least one pair of gears to be tested after aligning said one gear and said other gear by said aligning means.

2. The double-flank composite error tester as defined in claim 1, wherein:
said magnet constitutes a permanent magnet.

3. The double-flank composite error tester as defined in claim 1, wherein:
said magnet constitutes an electromagnet.

4. The double-flank composite error tester as defined in claim 1, wherein:
said one gear of said at least one pair of gears to be tested defining a circumferential direction and a radial direction; and
said magnet being displaceable in either one of said circumferential direction or said radial direction defined by said one gear.

5. The double-flank composite error tester as defined in claim 1, wherein:
said one gear of said at least one pair of gears to be tested defining a circumferential direction and a radial direction; and
said magnet being displaceable in said circumferential direction as well as in said radial direction defined by said one gear.

6. The double-flank composite error tester as defined in claim 1, wherein:
said other gear of said at least one pair of gears to be tested defining a circumferential and a radial direction; and
said positioning device being displaceable in either one of said circumferential direction and said radial direction defined by said other gear.

7. The double-flank composite error tester as defined in claim 1, wherein:
said other gear of said at least one pair of gears to be tested defining a circumferential and a radial direction; and
said positioning device being displaceable in said circumferential direction as well as in said radial direction defined by said other gear.

8. The double-flank composite error tester as defined in claim 1, further including:
gear teeth means fixedly associated with said other gear of said at least one pair of gears to be tested; and
said positioning device constituting a magnet acting upon said gear teeth means fixedly associated with said other gear in order to position said other gear in said predetermined relative position with respect to said predetermined rotary position of said one gear of said at least one pair of gears to be tested.

9. The double-flank composite error tester as defined in claim 1, wherein:
said positioning device further includes:
a sensor responding to either said tooth tips or said tooth spaces of the gear teeth of said other gear of said at least one pair of gears to be tested;
said sensor generating pulses corresponding to either said tooth tip or said tooth space of said other gear when said other gear is moved relative to said sensor;
pulse-controlled rotary drive means operatively associated with said other gear;
a pulse processing circuit arrangement operatively connected to said sensor and to said rotary drive means and controlling said rotary drive means; and
said pulse processing circuit arrangement correlating said pulses generated by said sensor to said gear teeth of said other gear by means of related teeth data.

10. The double-flank composite error tester as defined in claim 9, wherein:
said rotary drive means contain a stepping motor.

11. The double-flank composite error tester as defined in claim 9, wherein:
said rotary drive means contain a d.c. motor and a rotary transmitter controlled by said pulses generated by said pulse processing circuit arrangement.

12. The double-flank composite error tester as defined in claim 9, wherein:
said sensor is constituted by an inductive transmitter operating in a contactless manner.

13. The double-flank composite error tester as defined in claim 1, wherein:
said gear teeth means fixedly associated with said one gear of said at least one pair of gears to be tested are constituted by the gear teeth of said one gear.

14. The double-flank composite error tester as defined in claim 1, wherein:
said gear teeth means fixedly associated with said one gear of said at least one pair of gears to be tested is constituted by a positioning gear;
said positioning gear forming part of said at least one first gear holding support; and
said one gear of said at least one pair of gears to be tested being arranged such that said one gear can be coaxially coupled in a predetermined position with said positioning gear.

15. The double-flank composite error tester as defined in claim 14, wherein:
said gear teeth means of said positioning gear are located at the circumference thereof;
said gear teeth means of said positioning gear being constituted by webs arranged at a predetermined pitch;
said gear teeth of said one gear of said at least one pair of gears to be tested having a predetermined pitch; and
said predetermined pitch of said webs of said positioning gear being equal to said predetermined pitch of said gear teeth of said one gear.

16. The double-flank composite error tester as defined in claim 14, wherein:
said gear teeth means of said positioning gear are located at the circumference thereof;

said gear teeth means of said positioning gear being constituted by webs arranged at a predetermined pitch;

said gear teeth of said one gear of said at least one pair of gears to be tested having a predetermined pitch; and said predetermined pitch of said webs of said positioning gear constituting an integral fraction of said predetermined pitch of said gear teeth of said one gear.

17. The double-flank composite error tester as defined in claim 1, further including:

a first displaceable slide and a second displaceable slide constituting said at least one spring-loaded displaceable slide;

a gauging gear constituting said one gear of said at least one pair of gears to be tested;

said magnet of said aligning means for positioning said one gear in said predetermined rotary position being mounted at said first displaceable slide;

one other gear and one further gear collectively constituting said other gear of said at least one pair of gears to be tested;

said other gear and said further gear being fixedly and coaxially interconnected;

said second displaceable slide having essentially the same structure as said first displaceable slide;

a third gear holding support mounted at said second slide;

a second gauging gear supported at said third gear holding support;

said second gauging gear being arranged for engagement with said further gear;

a further magnet essentially identical with said magnet of said aligning means and provided for alignment at said second displaceable slide; and said further magnet being operatively associated with said second gauging gear in order to position said second gauging gear in a predetermined rotary position.

18. The double-flank composite error tester as defined in claim 17, wherein:

said second gauging gear defines a circumferential direction; and said further magnet being adjustable in said circumferential direction defined by said second gauging gear.

* * * * *

UNITED STATES PATENT AND TRADEMARK OFFICE
CERTIFICATE OF CORRECTION

PATENT NO. : 4,550,508
DATED : November 5, 1985
INVENTOR(S) : HANS SPAETH

It is certified that error appears in the above—identified patent and that said Letters Patent is hereby corrected as shown below:

Column 10, line 32, please delete "Vacumschmeize" and insert --Vacumschmelze--

Column 10, line 56, please delete "oear" and insert --gear--

Signed and Sealed this

Twenty-eighth Day of January 1986

[SEAL]

Attest:

Attesting Officer

DONALD J. QUIGG

Commissioner of Patents and Trademarks